US010279989B2

(12) United States Patent
Sanders et al.

(10) Patent No.: US 10,279,989 B2
(45) Date of Patent: May 7, 2019

(54) STACKABLE CONTAINER SYSTEM, OPERATING SYSTEM USING CONTAINER SYSTEM, AND METHOD

(71) Applicants: Robert W. Sanders, Conroe, TX (US); Jay J. Hunt, Conroe, TX (US)

(72) Inventors: Robert W. Sanders, Conroe, TX (US); Jay J. Hunt, Conroe, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 282 days.

(21) Appl. No.: 15/148,723

(22) Filed: May 6, 2016

(65) Prior Publication Data

US 2017/0320660 A1 Nov. 9, 2017

(51) Int. Cl.
| | |
|---|---|
| B65D 88/32 | (2006.01) |
| B65D 88/02 | (2006.01) |
| B65D 88/54 | (2006.01) |
| B65D 90/12 | (2006.01) |
| B65D 90/54 | (2006.01) |
| B65G 65/42 | (2006.01) |
| E21B 43/267 | (2006.01) |
| B65D 88/30 | (2006.01) |
| B65D 90/64 | (2006.01) |
| E21B 43/26 | (2006.01) |

(52) U.S. Cl.
CPC ........... *B65D 88/022* (2013.01); *B65D 88/30* (2013.01); *B65D 88/32* (2013.01); *B65D 88/54* (2013.01); *B65D 88/542* (2013.01); *B65D 90/12* (2013.01); *B65D 90/54* (2013.01); *B65D 90/64* (2013.01); *B65G 65/425* (2013.01); *E21B 43/267* (2013.01); *E21B 43/26* (2013.01)

(58) Field of Classification Search
CPC .. B65D 88/022; B65D 88/025; B65D 88/027; B65D 88/32; B65D 88/542
See application file for complete search history.

(56) References Cited

U.S. PATENT DOCUMENTS

| | | | |
|---|---|---|---|
| 3,843,027 | A | 10/1974 | Wilson et al. |
| 4,570,799 | A | 2/1986 | Mednis |
| 4,845,959 | A | 7/1989 | Magee |

(Continued)

FOREIGN PATENT DOCUMENTS

| | | |
|---|---|---|
| EP | 2524999 A2 | 11/2012 |
| WO | 2006089142 A2 | 8/2006 |

OTHER PUBLICATIONS

"Buckhorn CenterFlow Container"; Malt Handling, LLC; https://malthandling.com, 2014, 1 page.

(Continued)

*Primary Examiner* — Jonathan Snelting
(74) *Attorney, Agent, or Firm* — Cantor Colburn LLP

(57) ABSTRACT

A stackable container system configured to carry material includes at least one container having a first end and a second end, a holding area for the material, the holding area extending from the first end to the second end, a first opening at the second end, the material controllably releasable from the holding area through the first opening, and a chute that passes through the holding area, the chute extending from the first end to the second end, a first end of the chute including a receiving portion having a larger area than a combined area of the first opening and a second end of the chute.

23 Claims, 4 Drawing Sheets

(56) References Cited

U.S. PATENT DOCUMENTS

| | | | |
|---|---|---|---|
| 4,921,126 A | | 5/1990 | Waltke et al. |
| 5,080,259 A | * | 1/1992 | Hadley ................. B28C 7/0069 |
| | | | 141/102 |
| 5,307,956 A | | 5/1994 | Richter et al. |
| 5,794,818 A | | 8/1998 | Bromwell et al. |
| 5,829,616 A | | 11/1998 | Daniel et al. |
| 8,448,403 B1 | | 5/2013 | Wallace |
| 8,505,780 B2 | * | 8/2013 | Oren ...................... B65D 88/32 |
| | | | 222/185.1 |
| 8,550,303 B2 | | 10/2013 | Greer et al. |
| 8,622,251 B2 | | 1/2014 | Oren |
| 8,746,453 B1 | | 6/2014 | Hall et al. |
| 9,688,469 B2 | * | 6/2017 | Sheesley ................ B65D 88/30 |
| 9,758,082 B2 | * | 9/2017 | Eiden, III .............. B65G 65/42 |
| 2005/0023174 A1 | | 2/2005 | Lary et al. |
| 2008/0226434 A1 | * | 9/2008 | Smith .................. B65D 88/022 |
| | | | 414/332 |
| 2010/0025407 A1 | * | 2/2010 | Benson ................ B65D 88/022 |
| | | | 220/564 |
| 2014/0097182 A1 | | 4/2014 | Sheesley |
| 2014/0246341 A1 | | 9/2014 | Oren |
| 2015/0086307 A1 | | 3/2015 | Stefan |
| 2015/0320235 A1 | | 11/2015 | Carlson |

OTHER PUBLICATIONS

International Search Report for International Application No. PCT/US2017/030996; dated Aug. 4, 2017; 5 pages.
Written Opinion of the International Search Report for International Application No. PCT/US2017/030996; dated Aug. 4, 2017; 5 pages.

* cited by examiner

STACKABLE CONTAINER SYSTEM, OPERATING SYSTEM USING CONTAINER SYSTEM, AND METHOD

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration. To increase the production from a borehole, the production zone can be fractured to allow the formation fluids to flow more freely from the formation to the borehole. The fracturing operation includes pumping fluids at high pressure towards the formation wall to form formation fractures. To retail the fractures in an open condition after fracturing pressure is removed, the fractures must be physically propped open, and therefore the fracturing fluids commonly include solid granular materials, such as sand, generally referred to as proppants.

The granular material used for proppant can be brought to the well site via road, rail, or water. Transportable silos containing the proppant are situated at an area near the borehole and a conveyor belt system is used to deliver the proppant to a hopper, which subsequently feeds to a blender as needed, for blending with liquids and other additives to form the fracturing fluid.

As time, manpower requirements, and space issues are all variable factors that can significantly influence the cost effectiveness and productivity of a fracturing operation, the art would be receptive to improvements in containers for bulk solids and methods for using such containers to improve the processing of fracturing fluids.

BRIEF DESCRIPTION

A stackable container system configured to carry material includes at least one container having a first end and a second end, a holding area for the material, the holding area extending from the first end to the second end, a first opening at the second end, the material controllably releasable from the holding area through the first opening, and a chute that passes through the holding area, the chute extending from the first end to the second end, a first end of the chute including a receiving portion having a larger area than a combined area of the first opening and a second end of the chute.

An operating system includes a material receiving member and a stackable container system configured to carry material. The container system includes at least one container having a first end and a second end and includes a holding area for the material, the holding area extending from the first end to the second end, a first opening at the second end, the material controllably releasable from the holding area through the first opening and onto the material receiving member, and a chute that passes through the holding area, the chute extending from the first end to the second end, a first end of the chute including a receiving portion having a larger area than a combined area of the first opening and a second end of the chute. Material passed through the chute of the at least one container passes directly to the material receiving member.

A method of dispensing material from a stackable container system, the stackable container system including a plurality of containers including a first container and a second container, each of the plurality of containers having a first end and a second end and including a holding area for the material, the holding area extending from the first end to the second end, a first opening at the second end, the material controllably releasable from the holding area through the first opening, and a chute that passes through the holding area, the chute extending from the first end to the second end, a first end of the chute including a receiving portion having a larger area than a combined area of the first opening and a second end of the chute, includes: providing the material in each of the first and second containers; stacking the second container onto the first container to align the first opening of the second container and the second end of the chute of the second container with the receiving portion of the chute of the first container; and, selectively releasing the material from the holding area of the second container through the first opening of the second container into the chute of the first container.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
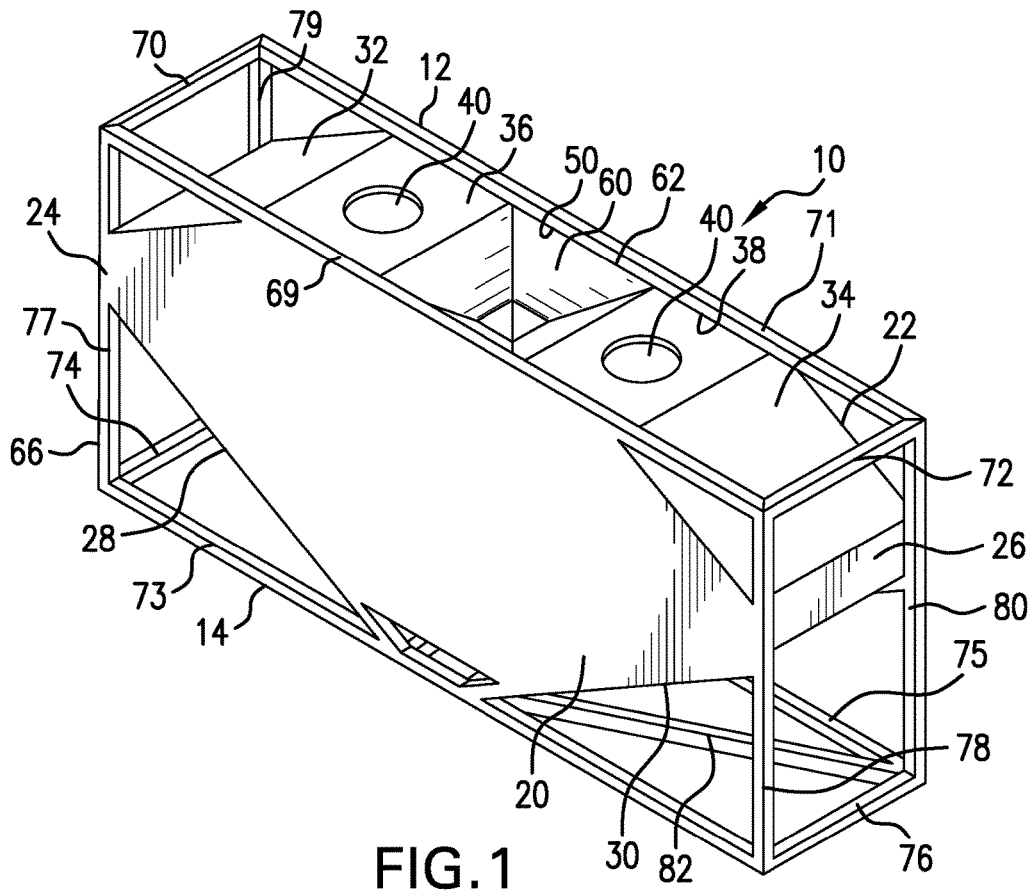
FIG. 1 depicts a perspective view of one embodiment of a stackable container.
Figure 2:
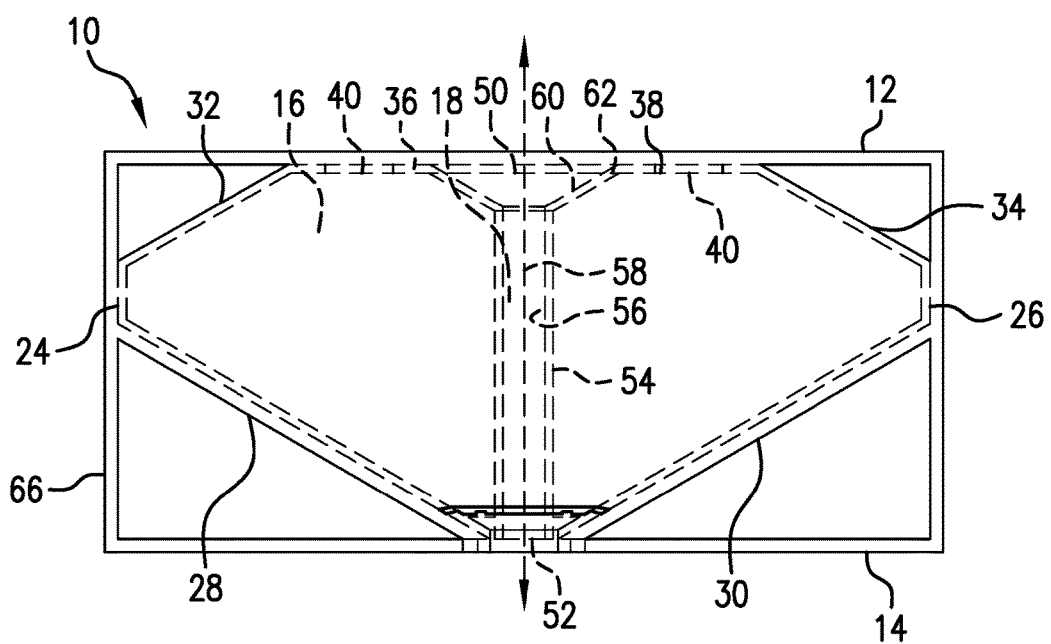
FIG. 2 depicts a front side view of an embodiment of the container, with portions of the interior of the container shown in phantom.
Figure 3:
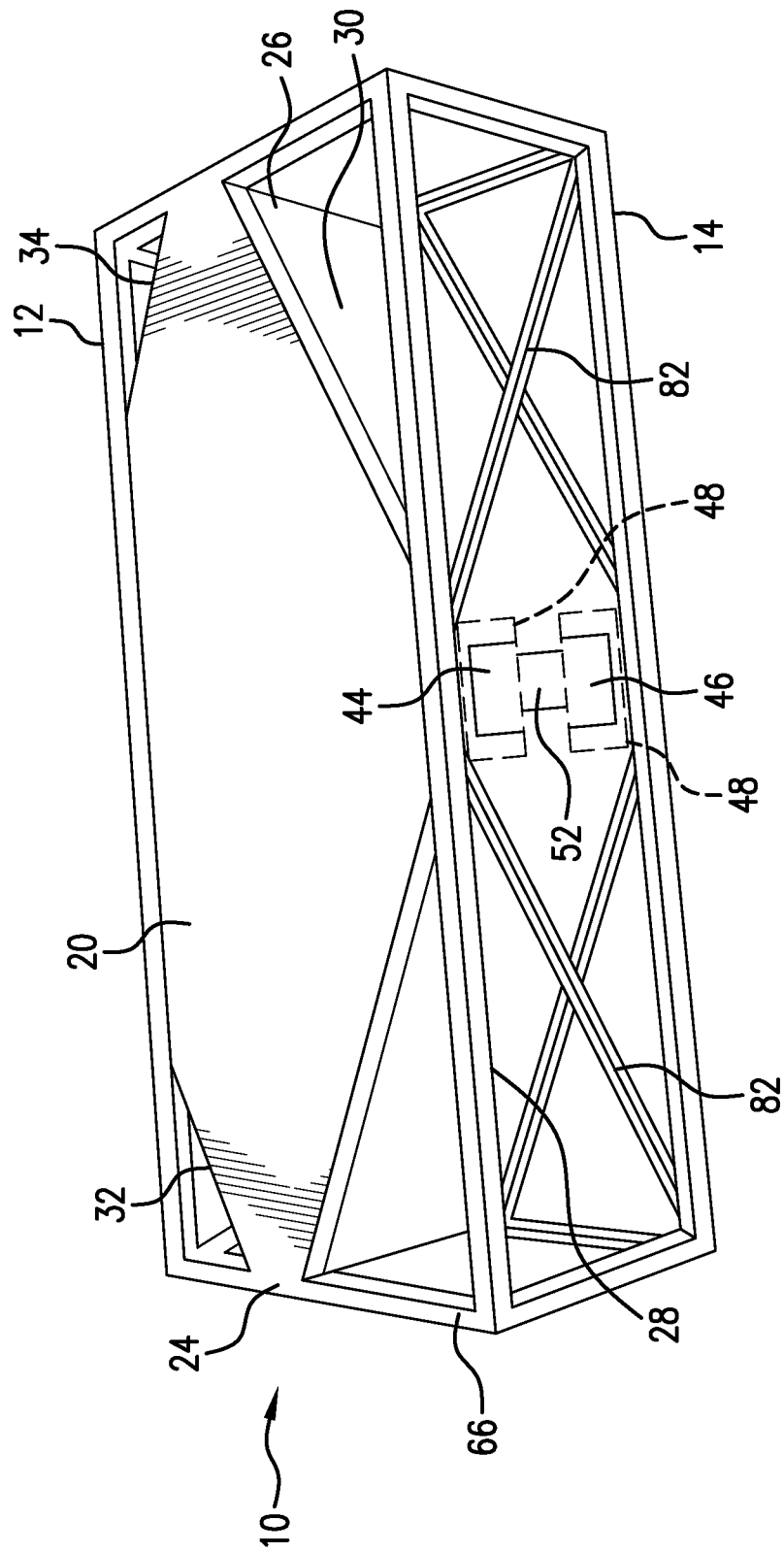
FIG. 3 shows a bottom perspective view of an embodiment of the container.

With reference to FIGS. 1-3, one embodiment of a stackable container 10 is shown. The container 10 may be used for the storage and transportation of bulk materials, such as bulk solids including, but not limited to, proppant, sand, or other dry bulk material with a fracturing fluid. While varying sizes of the container 10 are possible, the container 10 is designed for transport, and thus may conform to ISO standards with respect to dimensions. The container 10 may thus have a length and width sized to fit on a trailer bed or train platform, and a height sized for safe transport on roads and railway, as well as sized to be safely stacked with standard ISO containers.

The container 10 includes a first end 12 (a top end) and an opposing second end 14 (a bottom end). The container 10 further includes a holding area 16 for holding material within the container 10, and a pass-through chute 18 that bypasses the holding area 16. Both the holding area 16 and the chute 18 extend from the first end 12 to the second end 18 of the container 10. The holding area 16 may be defined in part by first and second opposing sides 20, 22 of the container 10, third and fourth sides 24, 26 of the container 10, and first and second walls 28, 30 that extend from the third and fourth sides 24, 26 of the container 10 to the second end 14 of the container 10. The first and second walls 28, 30 slope downwardly (at a non-zero angle with respect to both the first and second ends 12, 14 of the container 10 and the third and fourth sides 24, 26 of the container 10) towards the second end 14 of the container 10 such that material within the holding area 16 is slidable on the first and second walls 28, 30 towards the second end 14 due to gravity. As illustrated, the holding area 16 may further be defined by third and fourth walls 32, 34 that extend from the third and fourth sides 24, 26 of the container 10 towards the first end 12 of the container 10. Also, the holding area 16 may further be defined by fifth and sixth walls 36, 38 that extend partially along the first end 12 of the container 10. The fifth and sixth walls 36, 38 include apertures 40 that may be used for depositing material into the holding area 16. The apertures 40 may each include a cover 42 (FIG. 4) to protect the contents of the holding area 30 when not used for filling the holding area 16. A ventilation device (not shown) may be provided along the fifth and/or sixth wall 36, 38 of the holding area 16 or on the aperture covers 42 to ventilate the holding area 16 as needed. At the second end 14 of the container 10, the holding area 16 includes first and second openings 44, 46, each provided with a movable gate 48, such as a sliding gate, that is controllable to release the material contained within the holding area 16. The gate 48 may be manually or automatically controllable such that the material in the container 10 is selectively released. The gate 48 may, in one embodiment, be a hydraulic sliding gate. The gate 48 may also be controlled to open fully or partially to control the amount of material that is released, and may be closed to stop the material from exiting the container 10. The holding area 16 is further defined, in part, by the chute 18 that passes therethrough.

The chute 18 extends through the holding area 16 of the container 10, such that an interior space of the holding area 16 is centrally interrupted by the chute 18. The chute 18 includes a first end 50 at the first end 12 of the container 10, and a second end 52 at the second end 14 of the container 10. The second end 52 of the chute 18 is disposed between the first and second openings 44, 46, such that the first opening 44 is between the first side 20 and the chute 18, and the second opening 46 is between the second side 22 and the chute 18. The chute 18 provides a pass-through the container 10, and may be open from the first end 50 to the second end 52. The chute 18 has solid walls 54 with no entry into the holding area 16, and thus provides a channel in which material may pass through the container 10 without entering the holding area 16. The interior 56 of the chute 18 extends along an axis 58, such that materials may pass straight through the container 10 via the chute 18 along the axis 58. The first end 50 of the chute 18 includes a receiving portion 60 for receiving material into the chute 18. The material received in the receiving portion 60 may either be directly deposited into the chute 18 by an operator, or may come from either a chute of a container 10 stacked on top of the container 10, or from an opening 44 and/or 46 of a container 10 stacked on top of the container 10. In the illustrated embodiment, the receiving portion 60 is shaped as an inverted, truncated, regular square pyramid, where the base is formed as a receiving opening 62 at the first end 12 of the container 10. The illustrated receiving portion 60 thus includes four walls shaped as isosceles trapezoids. While one embodiment of the receiving portion 60 has been particularly disclosed, alternate shapes may be included which are capable of funneling materials from the receiving opening 62 to the remainder of the chute 18, noted as chute extension 64. Thus, the receiving portion 60 may take on any funnel shape for this purpose. The receiving opening 62 of the receiving portion 50 has an area which is greater than a combined area of the second end 52 of the chute 18 and the first and second openings 44, 46 of the holding area 16, so as to capture material from any container 10 stacked above.

The container 10 further includes a supporting frame 66 defining the edges of the container 10. In one embodiment, the supporting frame 66 includes first, second, third, and fourth beams 69, 70, 71, 72 at the first end 12 of the container 10, fifth, sixth, seventh, and eighth beams 73, 74, 75, 76 at the second end 14 of the container 10, ninth and tenth beams 77, 78 at the first side 20 of the container 10, and eleventh and twelfth beams 79, 80 at the second side 22 of the container 10. Additional cross beams 82 may be used to interconnect any combination of the beams 69-80 to provide additional structural support required by the container 10. Additionally, or alternatively, the supporting frame 66 may include solid walls (not shown) spanning the length, width, and height of the sides 20-26 of the container 10. The first and second ends 12, 14 of the container 10 may also include walls (not shown) as long as the apertures 40 and receiving opening 62 are accessible in the first end 12 of the container 10, and the first and second openings 44, 46 and the second end 52 of the chute 18 are exposable in the second end 14 of the container 10.

Figure 4:
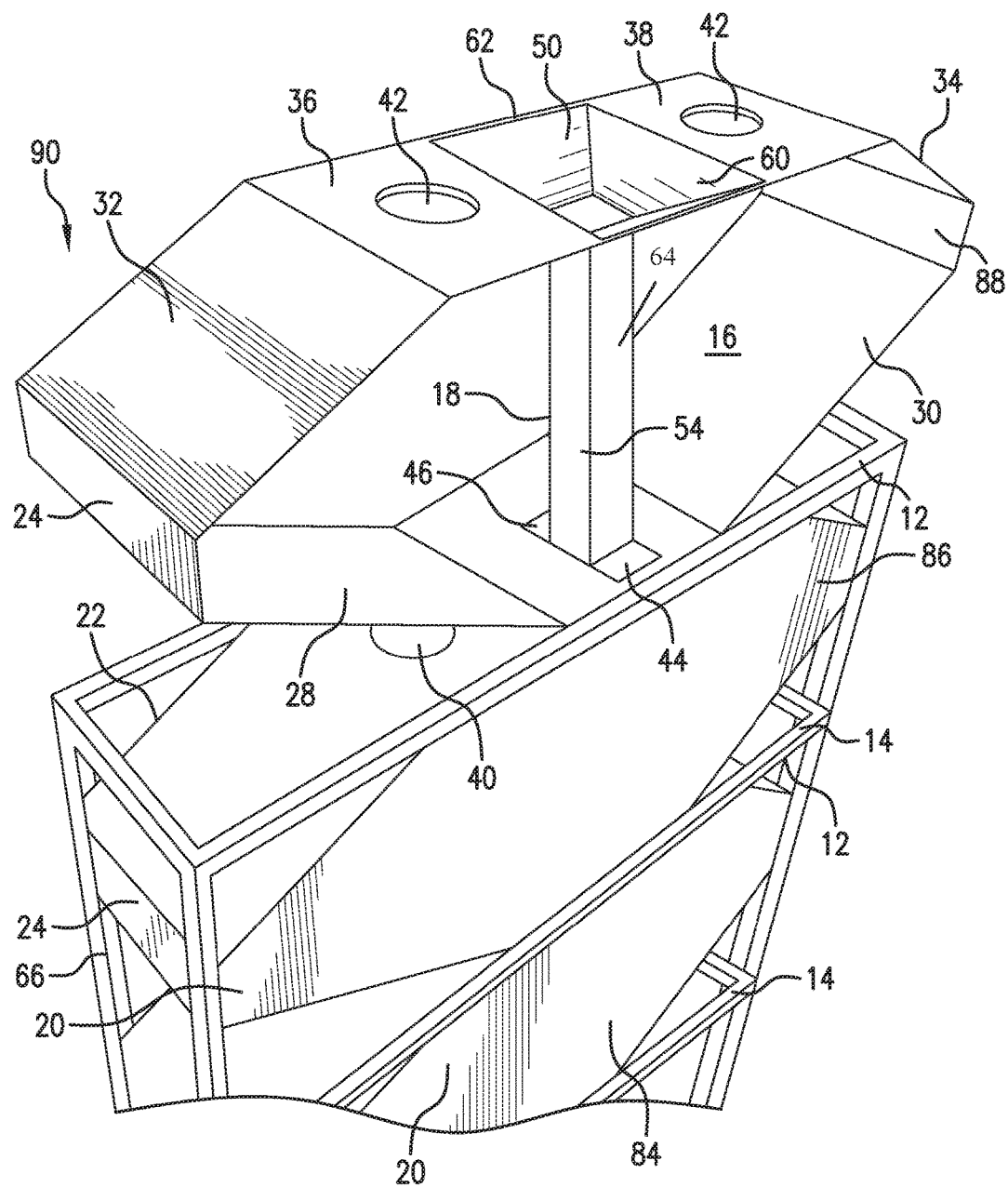
FIG. 4 shows a perspective view of an embodiment of a container system including three stacked containers, with a cutaway view of the uppermost container; and, FIG. 5 depicts a schematic view of an embodiment of an operating system usable for a downhole fracturing operation at a wellsite and having an embodiment of the container system.

Using the container 10 as described above with respect to FIGS. 1-3, the container 10 may be stacked onto one or more other containers 10 as demonstrated in FIG. 4. While the arrangement shown in FIG. 4 includes first, second, and third containers 84, 86, 88, it should be understood that any number of containers 10 may be employed. Also, for demonstration purposes, the third container 88 is illustrated as a cutaway view to depict the chute 18 within the holding area 16, however in actual use the third container 88 can be identical to the first and second containers 84, 86. The supporting frame 66 of each of the containers 10 is used for stacking onto an adjacent container's supporting frame 66. The chutes 18 of each of the first, second, and third containers 84, 86, 88 are aligned along axis 58 of chute 18 (see FIG. 2). Advantageously, because the receiving opening 62 of the chute 18 is sized larger than the combined size of the first and second openings 44, 46 and the second end 52 (a discharge end) of chute 18, and because the container 10 is essentially symmetrical with respect to the holding area 16 and chute 18, the containers 10 can be stacked in both a first orientation and a second orientation that is 180 degrees rotated from the first orientation, with the rotation along axis 58 that extends through the chute 18. Because the container 10 is essentially symmetrical with respect to the first and second sides 20, 22 about the axis 58, the first orientation and the second orientation would appear substantially identical in use.

With the arrangement of a container system 90 shown in FIG. 4, material can be selectively dispensed from any of the containers 10. If material is fully dispensed from the third container 88, or if the material within the third container 88 is no longer needed for an operation, the third container 88 can be removed from the stack of containers 10. Thus, the container system 90 does not require emptying of the first container 84 before the second container 86 and subsequently the third container 88 can be emptied, thus this system 90 enables removal of containers 10 that are no longer wanted from the stack. There is no need to empty the lowest (first) container 84 first, which provides increased efficiency because there is no need to retain all of the containers 10 in the stacked orientation. It is possible using this container system 90 to empty the third (top) container 88 first for quick removal, or any of the containers 10 can be opened as desired. Any container 10 can be selected regardless of position within the stack. Additionally, each of the containers 10 may contain a different material, such that the desired material can be easily released as desired. Further, the containers 10 may be unstacked and repositioned at any time, and are also usable individually and independently regardless of stacking position or orientation, as in rotations of 180 degrees apart.

Figure 5:
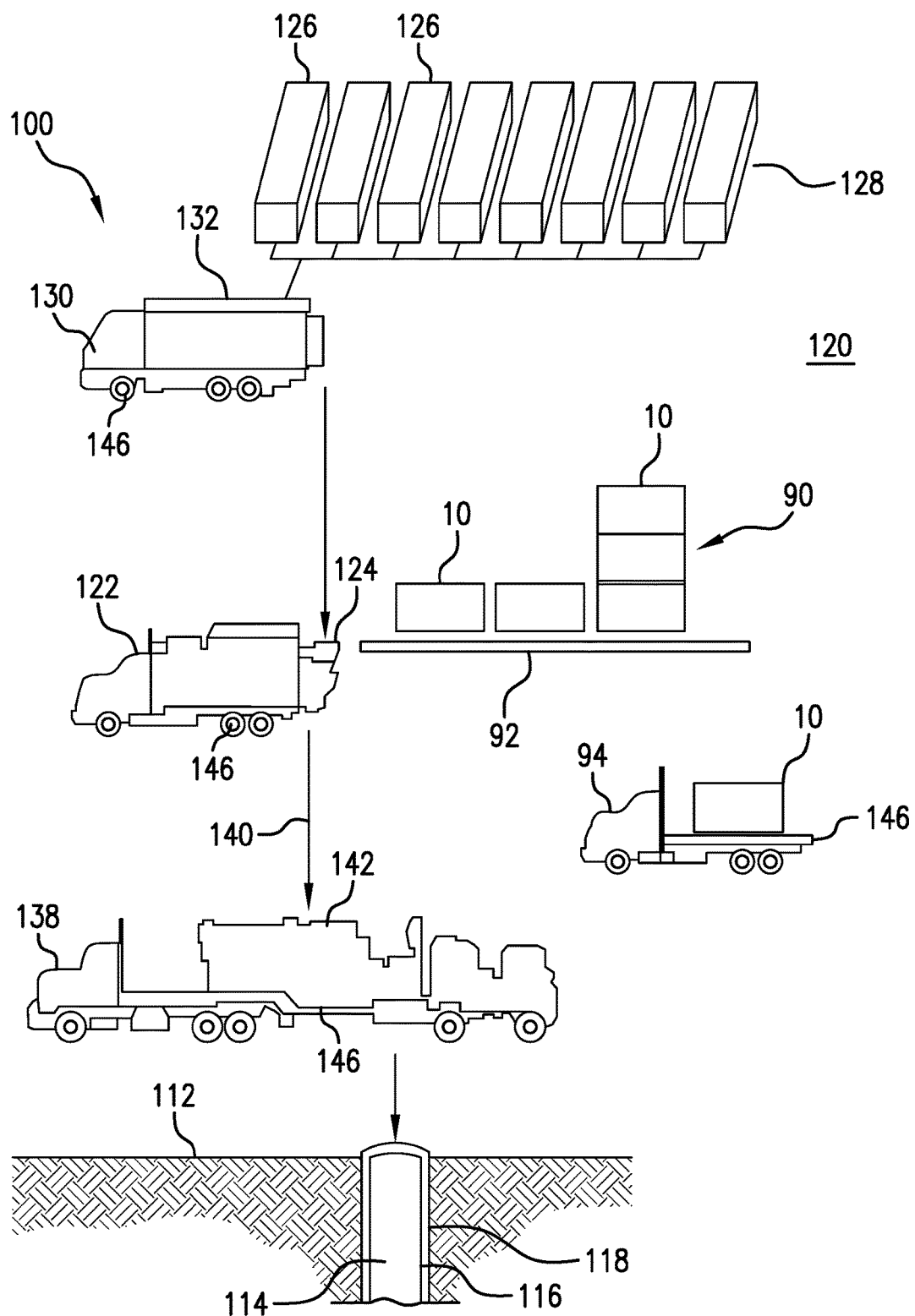

With reference now to FIG. 5, the container system 90, including a plurality of the containers 10, is depicted at a location within an operation system. In the illustrated embodiment, the location is a wellsite 120 and the operation system is a pump system for a hydraulic fracturing operation. A material receiving member 92, in one embodiment, includes a conveyor belt, however the member 92 may alternatively be a blender tub, a tank, a hopper, or a vessel on a ship. As an example in the illustrated embodiment, two of the containers 10 are positioned separately and spaced at different locations along the conveyor belt, while three containers 10 are stacked at yet another location along the conveyor belt. In such an embodiment, an operator may select any one or more of the containers 10 from which to discharge material. The stackable container system 90 is modular in nature so that many different arrangements can be satisfied, depending on the needs and convenience of the user. As an ISO container, the container 10 may further be transported by a tractor trailer 94, or by rail or sea. Because the container 10 is symmetrically designed, the containers 10 may be stacked on top of each other in two different orientations, for ease in delivery and set up of the containers 10. While the containers 10 may be used in a number of different manufacturing and industry environments, the container system 90 is particularly suited for use in a hydraulic fracturing operation for pumping a fluid from a surface 112 to a borehole 114, such as a hydraulic fracturing fluid. The borehole 114 may be cased or uncased, or include any other tubular 116 provided with perforations or openings for fracturing fluid to pass towards the formation wall 118. The operation system 100 (a fluid processing system) includes a blender 122. The blender 122 includes, in part, a blender tank or tub 124 for blending components of the fracturing fluid. Components of the fracturing fluid may include a base fluid (such as water), proppant, and various other additives to form a slurry of the hydraulic fracturing fluid. The base fluid may be stored in one or more water tanks 126 in a fluid supply 128. In one embodiment, prior to blending, the base fluid may be passed through a hydration system 130, which combines the base fluid with additives for a sufficient amount of residence time within a hydration tank 132 of the hydration system 130 to form a gel. The gel may then be directed to the blender 122 for combining with bulk materials stored in the container system 90, which may be positioned above a bulk material receiving member 92, such as a conveyor belt for selectively providing the blender 122 with the bulk material. The fracturing fluid is pumped from the blender 122 to a fracturing pump assembly 138 along flow line 140. The fracturing pump assembly 138 may include one or more fracturing pumps 142 (also known as "frac" pumps). While only one fracturing pump assembly 138 is depicted, a manifold may provide the fracturing fluid to multiple fracturing pump assemblies 138. The hydraulic fracturing fluid is then deliverable into the borehole 114 at high pressures by the one or more fracturing pump assemblies 138. The container system 90 could also be used to deliver sand after the blender to a sand injection apparatus designed to add dry products in a pressurized stream.

Any or all of the components of the system 100, including the blender 122, hydration system 130, one or more containers 10 of the container system 90, fluid supply 128, and fracturing pump assembly 138 may be provided on trailer beds, trucks, or other movable/wheeled platform or transportable surface 146 to assist in delivery of the components to the well site 120, and to enable such components to be reconfigured as needed at the wellsite 120, and quickly removed from the well site 120 when the process is completed. Alternatively, in an embodiment where the system 100 is utilized for an offshore well, the components may be positioned on a suitable fracturing and stimulation vessel (not shown).

Thus, the container system 90 provides one or more stackable containers 10 for the use of storage and transportation of material, such as bulk solids, that allows the pass through of flowing solids from above to below the container 10. This design allows a series of containers 10 to be stacked one on top of the other and placed above a conveyor, tub, vessel, etc. to discharge the material from any one or more of the stacked containers 10 to the material receiving member 92 below without requiring the use of other energy sources or requiring the containers 10 in between to be empty to allow pass through. The design utilizes a chute 18 that runs vertically through the container 10 with enough cross sectional area to allow material to flow. The container system 90 is independent of stacking orientation allowing the user to stack containers 10 in any arrangement. These embodiments allow an array of stacked containers 10 to discharge its contents to a receiving member 92 below in any order independent of stacking orientation. Also, this system 90 enables the use of multiple different types of material to be dispensed from each container 10 in the container system 90, although any two or more containers 10 could also contain the same material. When two or more containers 10 are stacked, the opening of a discharge gate 48 on any of the stacked containers 10 will allow the contents of that container 10 to be discharged through the aligned chutes 18 and to the material receiving member 92.

Set forth below are some embodiments of the foregoing disclosure:

Embodiment 1

A stackable container system configured to carry material, the container system including at least one container having a first end and a second end and comprising: a holding area for the material, the holding area extending from the first end to the second end, a first opening at the second end, the material controllably releasable from the holding area through the first opening; and, a chute that passes through the holding area, the chute extending from the first end to the second end, a first end of the chute including a receiving portion having a larger area than a combined area of the first opening and a second end of the chute.

Embodiment 2

The stackable container system of any of the preceding embodiments, wherein the at least one container further comprises a second opening at the second end of the at least one container, the material controllably releasable from the holding area through the second opening, the chute interposed between the first and second openings.

Embodiment 3

The stackable container system of any of the preceding embodiments, wherein the at least one container further comprises a first side and a second side, the first and second sides extending between the first and second ends of the at least one container, wherein the first opening is disposed between the first side and the chute, and the second opening is disposed between the second side and the chute.

Embodiment 4

The stackable container system of any of the preceding embodiments, wherein the holding area includes at least one filling aperture at a first end of the at least one container.

Embodiment 5

The stackable container system of any of the preceding embodiments, wherein the holding area includes first and second walls, the chute disposed between the first and second walls, each wall sloped downwardly towards the first opening, wherein material within the holding area is slidable on the first and second walls towards the first opening due to gravity.

Embodiment 6

The stackable container system of any of the preceding embodiments, wherein the first opening includes a movable gate arranged to selectively block and reveal the first opening.

Embodiment 7

The stackable container system of any of the preceding embodiments, wherein the receiving portion is substantially funnel shaped.

Embodiment 8

The stackable container system of any of the preceding embodiments, wherein material in the holding area is separated from an interior of the chute by walls of the chute

Embodiment 9

The stackable container system of any of the preceding embodiments, wherein the at least one container comprises a first container and a second container stacked onto the first container, wherein the first opening of the second container and the second end of the chute of the second container are arranged to dispense into the receiving portion of the chute of the first container.

Embodiment 10

The stackable container system of any of the preceding embodiments, wherein the first container includes a first supporting frame, and the second container includes a second supporting frame, and the second supporting frame is removably stackable on the first supporting frame in at least two different orientations.

Embodiment 11

The stackable container system of any of the preceding embodiments, wherein the at least two different orientations includes a first orientation and a second orientation rotated 180 degrees from the first orientation, wherein the material is dispensable from the second container into the first container in both the first and second orientations.

Embodiment 12

The stackable container system of any of the preceding embodiments, wherein material passed through the chute of the second container passes directly into the chute of the first container.

Embodiment 13

The stackable container system of any of the preceding embodiments, wherein the at least one container further includes a third container stacked on the second container, wherein the first opening of the third container and the second end of the chute of the third container are arranged to dispense into the receiving portion of the chute of the second container.

Embodiment 14

An operating system comprising: a material receiving member; and, a stackable container system configured to carry material, the container system including at least one container having a first end and a second end and including: a holding area for the material, the holding area extending from the first end to the second end, a first opening at the second end, the material controllably releasable from the holding area through the first opening and onto the material receiving member; and, a chute that passes through the holding area, the chute extending from the first end to the second end, a first end of the chute including a receiving portion having a larger area than a combined area of the first opening and a second end of the chute; wherein material passed through the chute of the at least one container passes directly to the material receiving member.

Embodiment 15

The operating system of any of the preceding embodiments, wherein the material receiving member is one of a conveyor belt, hopper, blender tub, and material injection apparatus.

Embodiment 16

The operating system of any of the preceding embodiments, wherein the material is a bulk solid material for a hydraulic fracturing fluid.

Embodiment 17

The operating system of any of the preceding embodiments, further comprising a blender configured to receive the material from the container system.

Embodiment 18

The operating system of any of the preceding embodiments, wherein the blender blends a hydraulic fracturing fluid using the material, and further comprising a high pressure fracturing pump configured to receive the hydraulic fracturing fluid from the blender.

Embodiment 19

A method of dispensing material from a stackable container system, the stackable container system including a plurality of containers including a first container and a second container, each of the plurality of containers having a first end and a second end and including a holding area for the material, the holding area extending from the first end to the second end, a first opening at the second end, the material controllably releasable from the holding area through the first opening, and a chute that passes through the holding area, the chute extending from the first end to the second end, a first end of the chute including a receiving portion having a larger area than a combined area of the first opening and a second end of the chute, the method comprising: providing the material in each of the first and second containers; stacking the second container onto the first container to align the first opening of the second container and the second end of the chute of the second container with the receiving portion of the chute of the first container; and, selectively releasing the material from the holding area of the second container through the first opening of the second container into the chute of the first container.

Embodiment 20

The method of any of the preceding embodiments, wherein selectively releasing the material includes passing the material from the chute of the first container onto one of a conveyor belt, blender tub, and hopper.

Embodiment 21

The method of any of the preceding embodiments, further comprising selectively releasing the material from the holding area of the first container through the first opening of the first container and onto a material receiving member.

Embodiment 22

The method of any of the preceding embodiments, wherein selectively releasing the material from the holding area of the first and second containers through the first opening of the first and second containers includes controlling a movable gate at each first opening of the first and second containers.

Embodiment 23

The method of any of the preceding embodiments, wherein each of the plurality of containers includes a second opening at the second end, material controllably releasable from the holding area through the second opening, the second end of the chute interposed between the first and second openings, and stacking the second container onto the first container includes aligning the second container onto the first container in either of a first orientation or a second orientation rotated 180 degrees from the first orientation.

Embodiment 24

The method of any of the preceding embodiments, wherein providing the material in each of the first and second containers includes providing a first material in the first container that is different than a second material in the second container.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A stackable container system configured to carry material, the container system including a first container and a second container stackable on the first container, each container having a first end and a second end and each container comprising:
   a holding area for the material, the holding area extending from the first end to the second end, a first opening at the second end, the material controllably releasable from the holding area through the first opening; and,
   a chute that passes through the holding area, the chute extending from the first end to the second end, a first end of the chute including a receiving portion having a larger area than a combined area of the first opening and a second end of the chute;
   wherein, when the second container is stacked on the first container, the first opening of the second container and the second end of the chute of the second container are arranged to dispense material from the second container into the receiving portion of the chute of the first container to pass the material from the second container through the first container without entering the holding area of the first container.

2. The stackable container system of claim 1, wherein the second container further comprises a second opening at the second end of the second container, the material in the second container controllably releasable from the holding area of the second container through the second opening, the chute of the second container interposed between the first and second openings of the second container.

3. The stackable container system of claim 2, wherein the second container further comprises a first side and a second side, the first and second sides extending between the first and second ends of the second container, wherein the first opening of the second container is disposed between the first side and the chute of the second container, and the second opening is disposed between the second side and the chute of the second container.

4. The stackable container system of claim 1, wherein the holding area of the first container includes at least one filling aperture at the first end of the first container, and the holding area of the second container includes at least one filling aperture at the first end of the second container.

5. The stackable container system of claim 1, wherein the holding area of the second container includes first and second walls, the chute of the second container disposed between the first and second walls, each wall sloped downwardly towards the first opening of the second container, wherein material within the holding area of the second container is slidable on the first and second walls towards the first opening of the second container due to gravity.

6. The stackable container system of claim 1, wherein the first opening of the second container includes a movable gate arranged to selectively block and reveal the first opening of the second container.

7. The stackable container system of claim 1, wherein the receiving portion of the first container is substantially funnel shaped.

8. The stackable container system of claim 1, wherein material in the holding area of the first container is separated from an interior of the chute of the first container by walls of the chute of the first container.

9. The stackable container system of claim 1, wherein the first container includes a first supporting frame, and the second container includes a second supporting frame, and the second supporting frame is removably stackable on the first supporting frame in at least two different orientations.

10. The stackable container system of claim 9, wherein the at least two different orientations includes a first orientation and a second orientation rotated 180 degrees from the first orientation, wherein the material in the second container is dispensable from the second container into the chute of the first container in both the first and second orientations.

11. The stackable container system of claim 1, wherein material passed through the chute of the second container passes directly into the chute of the first container.

12. The stackable container system of claim 1, further comprising a third container stacked on the second container, wherein a first opening of a holding area of the third container and an end of a chute of the third container are arranged to dispense into the receiving portion of the chute of the second container.

13. An operating system comprising:
a material receiving member; and,
the stackable container system of claim 1;
wherein material from the holding area of the second container that is passed through the chute of the first container bypasses the holding area of the first container and discharges to the material receiving member.

14. The operating system of claim 13, wherein the material receiving member is one of a conveyor belt, hopper, blender tub, and material injection apparatus.

15. The operating system of claim 13, wherein the material is a bulk solid material for a hydraulic fracturing fluid.

16. The operating system of claim 13, further comprising a blender configured to receive the material from the container system.

17. The operating system of claim 16, wherein the blender blends a hydraulic fracturing fluid using the material, and further comprising a high pressure fracturing pump configured to receive the hydraulic fracturing fluid from the blender.

18. A method of dispensing material from the stackable container system of claim 1, wherein the material in the first container including is a first container material and the material in the second container is a second material, the method comprising:
providing the first material in the first container and providing the second material in the second container;
stacking the second container onto the first container to align the first opening of the second container and the second end of the chute of the second container with the receiving portion of the chute of the first container; and,
selectively releasing the second material from the holding area of the second container through the first opening of the second container into the chute of the first container.

19. The method of claim 18, wherein selectively releasing the second material includes passing the second material from the chute of the first container onto one of a conveyor belt, blender tub, and hopper.

20. The method of claim 18, further comprising selectively releasing the first material from the holding area of the first container through the first opening of the first container and onto a material receiving member.

21. The method of claim 20, wherein selectively releasing the first and second materials from the holding areas of the first and second containers through the first openings of the first and second containers includes controlling a movable gate at each first opening of the first and second containers.

22. The method of claim 18, wherein the second container includes a second opening at the second end of the second container, the second material controllably releasable from the holding area of the second container through the second opening of the second container, the second end of the chute of the second container interposed between the first and second openings of the second container, and stacking the second container onto the first container includes aligning the second container onto the first container in either of a first orientation or a second orientation rotated 180 degrees from the first orientation.

23. The method of claim 18, wherein the first material in the first container is different than the second material in the second container.

* * * * *